June 14, 1932. H. E. NORVIEL Re. 18,498

IGNITION APPARATUS

Original Filed March 25, 1926 2 Sheets-Sheet 1

Inventor
Harry E. Norviel,
deceased

By Spencer Hardman & Fehr
Attorneys

June 14, 1932. H. E. NORVIEL Re. 18,498

IGNITION APPARATUS

Original Filed March 25, 1926 2 Sheets-Sheet 2

Inventor

Harry E. Norviel
deceased

By Spencer Hardman & Fehr
Attorneys

Reissued June 14, 1932

Re. 18,498

UNITED STATES PATENT OFFICE

HARRY E. NORVIEL, DECEASED, LATE OF ANDERSON, INDIANA, BY DELCO-REMY CORPORATION, OF ANDERSON, INDIANA, ASSIGNEE

IGNITION APPARATUS

Original No. 1,828,378, dated October 20, 1931, Serial No. 97,457, filed March 25, 1926. Application for reissue filed April 12, 1932. Serial No. 604,842.

This invention relates to devices for preventing the unauthorized use or the theft of an automotive vehicle and particularly to key operated devices for controlling the ignition system of an internal combustion engine.

One way of rendering the ignition operative although the ignition switch is locked in "off" position, is to bridge the switch terminals leading to the battery and ignition coil respectively. One of the objects of the present invention is to prevent manipulation of the ignition apparatus in this manner. This object is accomplished by combining an ignition coil and a key operated ignition switch in a unitary structure which can be disassembled only after the switch has been turned by the key to "on" position.

Further objects and advantages of the present invention will be apparent from the following description, reference being had to the accompanying drawings, wherein a preferred form of embodiment of the present invention is clearly shown.

Figure 1:
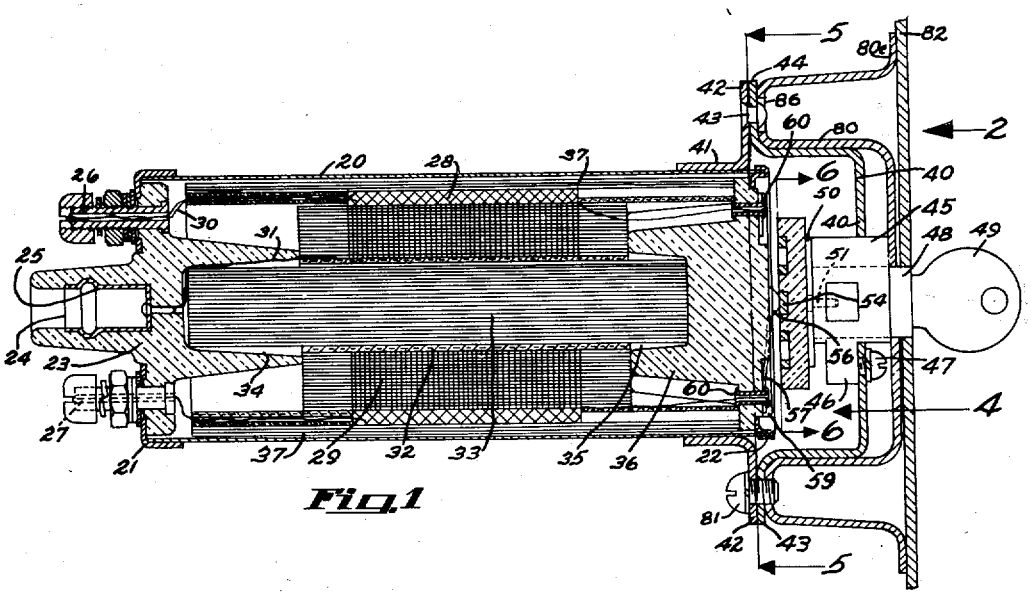
Fig. 1 is a longitudinal sectional view of a unitary coil and switch structure constructed in accordance with the present invention.
Figure 2:
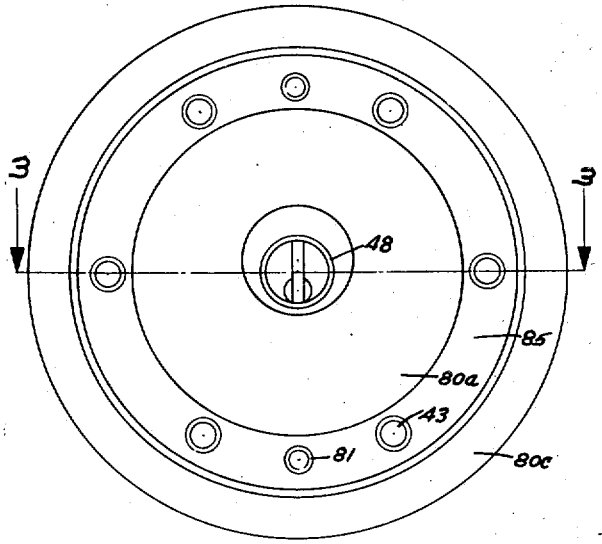
Fig. 2 is an end view looking in the direction of arrow 2 in Fig. 1.

One form of ignition coil with which the present invention may be used includes a coil housing comprising a metallic tubular portion 20 permanently attached to metallic end covers 21 and 22. The cover 21 supports a non-conducting body 23 having a cable receiving socket 24 provided with a conducting lining member 25 which provides the secondary coil terminal socket which is adapted to receive a flexible insulating conductor leading from the secondary circuit of the coil to an ignition distributor. The body 23 supports terminals 26 and 27 connected respectively with the outside and inside of layers of windings of a primary ignition coil 28. The coil 28 surrounds a secondary ignition coil 29 having its outside end wire 30 connected with the terminal 26 and its inside end wire 31 connected with the conducting socket lining member 25. The coils 28 and 29 surround a non-conducting tube 32 through which a central core 33 extends. The core 33 is formed preferably by a bundle of relatively small iron wires and the ends of the core are received respectively by recesses 34 and 35 provided respectively by the non-conducting body 23 and the non-conducting body 36. It is apparent from Fig. 1 that the body 36 will be maintained in the position shown between the core 33 and the end cover 22 after the parts shown have been assembled. The space between the primary winding 28 and the housing member 20 is occupied by external magnetic circuit members 37 which may be provided by small wires or thin plates.

The ignition coil is combined in a unitary structure with a switch having a case 40, for which the ignition coil provides a cover. The coil is attached to the case 40 by means including a tubular body or ring 41 permanently attached to the housing member 20 and having a flange 42 which is attached by rivets 43 to a flange 44 of the switch case 40. The cylinder member 45 of a pin tumbler lock is provided with arms 46 which are attached by screws 47 to the switch case 40 which is provided with an aperture suitable for receiving the cylinder 45. The cylinder 45 supports a rotatable key plug 48 for receiving a proper key 49 by which the key plug 48 may be turned. A plate 50 is attached by screws 51 to the plug 48 and is attached by rivets 52 to a non-conducting plate 53 provided with a metallic insert 54 which is attached to the plate 53 preferably by molding the material of the plate about the insert. The conductor 54 constitutes the movable contact of the ignition switch and is provided with holes or depressions 55 for receiving the somewhat spherical projections 56 formed on the free ends of leaf spring conductors 57. The conductors 57 are received by grooves 58 provided in a somewhat oblong shaped boss 59 formed integral with the insulating body 36 and projecting through a similarly shaped opening in the coil housing member 22. The contact plates 57 are secured by hollow rivets 60 through which connections are made between the contacts 57 and the ignition primary coil 28. These connections are provided by winding one more turn than necessary in the last or outside layer of turns of the primary coil 28. The turn of the outside layer which is nearest the insulating body 36 is cut at its middle point to provide two wires 61 and 62 which connect respectively the outside layer 63 of the primary coil 28 and the preceding inside layer 64 with one of the switch contacts 57, as shown diagrammatically in Fig. 7.

Figure 3:
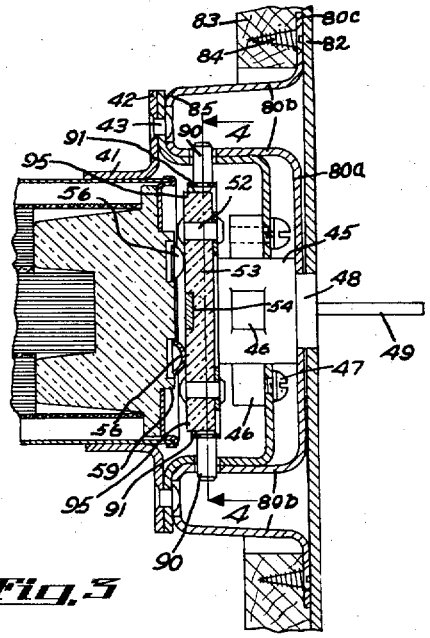
Fig. 3 is a fragmentary longitudinal sectional view on the line 3—3 of Fig. 2.
Figure 4:
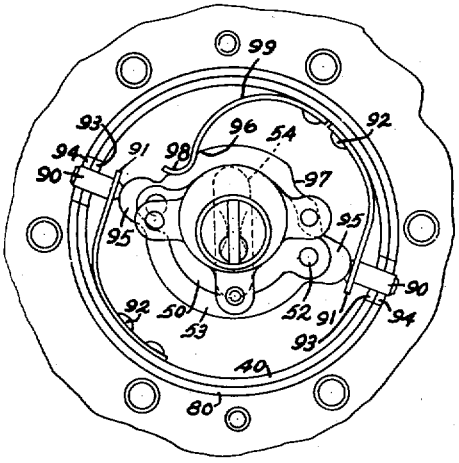
Fig. 4 is an end view, partly in section, looking in the direction of arrow 4 of Fig. 1, showing the coil and switch unit removed from its mounting bracket, the section through the switch case being taken on the line 4—4 of Fig. 3.
Figure 5:
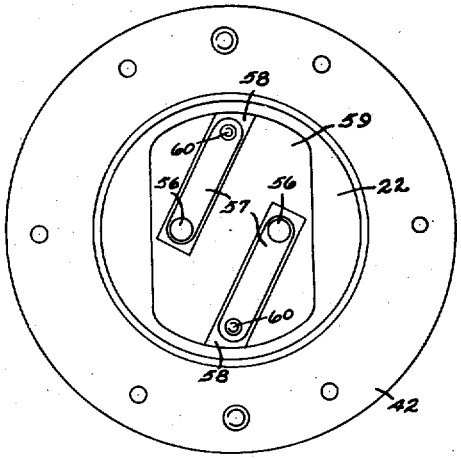
Fig. 5 is an end view on the line 5—5 of Fig. 1 of the ignition coil after being disassembled from the switch case.
Figure 6:
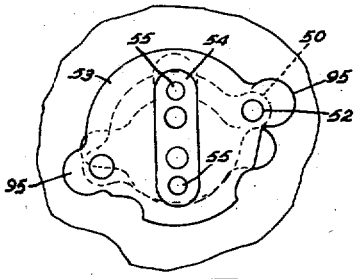
Fig. 6 is a fragmentary view on the line 6—6 of Fig. 1.
Figure 7:
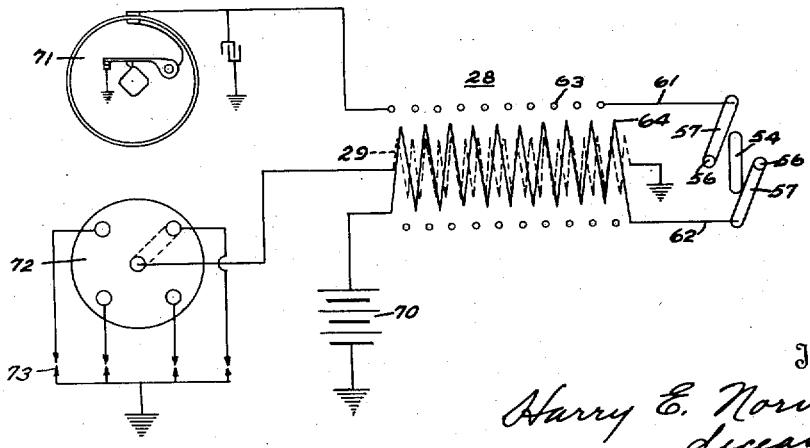
Fig. 7 is a wiring diagram illustrating the use of the present invention.

If the movable contact 54 is turned 90° from the position shown in Figs. 1, 4 and 6, it will be engaged by the contacts 57, the spherical ends 56 snapping into the holes 55 of the contact 54. This operation will connect a battery 70 with the ignition coil primary winding 28 and with an ignition timer 71 as shown in Fig. 7. The secondary coil, which is represented by broken lines 29 in Fig. 7, is connected with a suitable ignition distributor 72. When the timer is operated by the engine, ignition impulses will be created in the ignition coil and will be distributed to the various spark plugs 73. Turning the key 49 to the position shown in Figs. 1 and 3 will cause the contact 54 to be disengaged from the contacts 57 so that the ignition apparatus will be rendered inoperative and the engine will stop. When the key is in this latter position, it may be removed from the lock. Hence the ignition switch cannot be operated without the proper key.

In order to prevent disassembling of the ignition coil from the switch case 40 while the ignition switch is locked in "off" position, means are provided for rendering the rivets 43 inaccessible to such tools as a chisel by which the heads of the rivets could be removed. This means includes a mounting bracket 80 to which the coil and switch assembly is attached by screws 81 which pass through plain holes in the flanges 42 and 44 and through tapped holes in the bracket 80. The bracket 80 comprises a central disc portion 80*a* which merges into an annulus 80*b* of channel shaped cross section and then into a circular flange 80*c*. The flange 80*c* is permanently attached to the instrument or dash board of the vehicle. If a thin metal dash is used alone without a wooden backing as indicated at 82 in Fig. 1, the flange 80*c* is secured to the dash by welding or brazing. But if a wooden backing 83 is used, the flange 80*c* may be secured by screws 84 to the wooden backing 83, and the heads of the screws 84 will be covered by the metal dash 82.

The wall 85 forming a part of the channel shaped section 80*b* of bracket 80 is provided with a number of holes 86 for receiving the heads of the rivets 43. Although the screws 81 may be removed, the coil and switch assembly cannot be removed from the bracket 80, while the ignition switch is locked in "off" position. This is accomplished by a lock controlled device including studs 90 mounted on leaf spring members 91, attached at 92 to the switch case 40. The case 40 is provided with diametrically opposite holes 93 which are aligned with diametrically opposite holes 94 in the bracket 80. The holes 93 and 94 receive the studs 90 which, when in the position shown in Figs. 3 and 4, will prevent separation of the parts 40 and 80. When the switch is locked, the pins 90 will be held in locking position due to engagement thereof with lugs 95, which are provided by the non-conducting body 53. When the switch is turned to "on" position, the lugs 95 will be moved out of engagement with the studs 90 so that the springs 91 will be released to move the studs 90 inwardly and disengage them from the bracket 80. Then the switch and coil assembly may be removed from the bracket. In order to assist in locating the contact 54 in "off" and "on" positions, the plate 53 is provided with notches 96 and 97 for receiving the end 98 of a leaf spring 99 which is attached to the switch case 40.

In case the coil should fail to operate, it is not necessary to discard the entire switch and coil unit. After removal of this unit from its bracket, the rivets 43 may be removed by a chisel or a drill and a new coil may be quickly substituted. The only parts of the switch which are discarded are the contacts 57. The lock and the more expensive parts of the switch remain assembled with the switch case.

While the form of embodiment of the present invention as herein disclosed, constitutes a preferred form, it is to be understood that other forms might be adopted, all coming within the scope of the claims which follow.

What is claimed is as follows:

1. Ignition apparatus comprising, in combination, an ignition coil having a housing providing a switch case member; a second switch case member; means for attaching together the switch case members; an ignition switch enclosed by said members; means enclosed by the housing for electrically connecting a coil winding with the switch; means for rendering the attaching means inaccessible for removal; and a key controlled device for operating the switch and for locking said last means in operative position.

2. Ignition apparatus, such as defined by claim 1, in which the means for rendering the attaching means inaccessible for removal is a bracket for mounting the apparatus.

3. Ignition apparatus comprising, in combination, an ignition coil having a housing providing a switch case member; a second switch case member attached to the housing; a switch having contacts attached to the housing and a contact connected with the second switch case member, and adapted to engage the other contacts when the switch case members are assembled.

4. Ignition apparatus, such as defined by claim 3, and in which the coil housing includes an insulating member supporting certain coil parts, said member extending through the coil housing into the switch case and supporting a switch contact.

5. Ignition apparatus, such as defined by claim 3, in which the switch contacts which are attached to the housings are connected respectively, with the ending lead and the starting lead of adjacent layers of a coil winding.

6. In an ignition system for an internal combustion engine of an automotive vehicle, a unit comprising: an element essential in said system for the operation of said engine; a first theft-resisting casing at least partially enclosing said element; lock-controlled switch means; connections connecting said switch means in controlling relation with said element; and a second theft-resisting casing at least partially enclosing said switch means and united rim to rim with said first theft-resisting casing by a joinder securing said casings into a single enclosure for preventing at least unauthorized access to said switch means and said connections and at least the adjacent portion of said element, at least not without disruption of said unit.

7. In an ignition system for an internal combustion engine of an automotive vehicle, a unit comprising: the ignition coil of said system; a first theft-resisting casing at least partially enclosing said coil; lock-controlled switch means; connections connecting said switch means in controlling relation with said coil; and a second theft-resisting casing at least partially enclosing said switch means and united rim to rim with said first theft-resisting casing by a joinder securing said casings into a single enclosure for preventing at least unauthorized access to said switch means and said connections and at least the adjacent portion of said coil, at least not without disruption of said unit.

8. In an iginition system for an internal combustion engine of an automotive vehicle, a unit comprising: a first unitary article of manufacture including, an element essential in said system for the operation of said engine, and a first-resisting casing supporting and at least partially enclosing said element; a second unitary article of manufacture including, lock-controlled switch means, and a second theft-resisting casing supporting and at least partially enclosing said switch means; connections connecting said switch means in controlling relation with said element; and means uniting said second theft-resisting casing with said first theft-resisting casing completely enclosing said switch means and said connections and securing said casings into a single enclosure for preventing at least unauthorized access to said switch means and said connections and at least the adjacent portion of said element at least not without disruption of said unit.

9. In an iginition system for an internal combustion engine of an automotive vehicle, a unit comprising: a first unitary article of manufacture including, the ignition coil of said system, and a first theft-resisting casing supporting and at least partially enclosing said coil; a second unitary article of manufacture including, lock-controlled switch means, and a second theft-resisting casing supporting and at least partially enclosing said switch means; connections connecting said switch means in controlling relation with said coil; and means uniting said second theft-resisting casing with said first theft-resisting casing completely enclosing said switch means and said connections and securing said casings into a single enclosure for preventing at least unauthorized access to said switch means and said connections and at least the adjacent portion of said coil, at least not without disruption of said unit.

10. In an ignition system for an internal combustion engine of an automotive vehicle, a unit comprising: a first unitary article of manufacture including, an element essential in said system for the operation of said engine, and a first theft-resisting casing supporting and at least partially enclosing said element; a second unitary article of manufacture including, a lock-switch and a second theft-resisting casing supporting and at least partially enclosing said switch; connections connecting said switch in controlling relation with said element; and means uniting said second theft-resisting casing with said first theft-resisting casing completely enclosing said switch and said connections and securing said casings into a single enclosure for preventing at least unauthorized access to said switch and said connections and at least the adjacent portion of said element, at least not without disruption of said unit.

11. In an ignition system for an internal combustion engine of an automotive vehicle a unit comprising: a first unitary article of manufacture including, the ignition coil of said system, and a first theft-resisting casing supporting and at least partially enclosing said coil; a second unitary article of manufacture including, a lock-switch, and a second theft-resisting casing supporting and at least partially enclosing said switch; connections connecting said switch in controlling relation with said coil; and means uniting said second theft-resisting casing with said first theft-resisting casing completely enclosing switch and said connections and securing said casings into a single enclosure for preventing at least unauthorized access to said switch and said connections and at least the adjacent portion of said coil, at least not without disruption of said unit.

12. In an ignition system for an internal combustion engine of an automotive vehicle, a unit comprising: a first unitary article of manufacture including, an element essential in said system for the operation of said engine, and a first theft-resisting casing supporting and at least partially enclosing said element; a second unitary article of manufacture including, lock controlled switch means, and a second theft-resisting casing supporting and at least partially enclosing said switch means; connections connecting said switch means in controlling relation with said element; and means uniting said second theft-resisting casing with said first theft-resisting casing completely enclosing said switch means and said connections and securing said casings into a single enclosure for preventing at least unauthorized access to said switch means and said connections and at least the adjacent portion of said element, at least not without disruption of said unit, said second casing being provided with mounting means for said unit.

13. In an ignition system for an internal combustion engine of an automotive vehicle, a unit comprising: a first unitary article of manufacture including, the ignition coil of said system, and a first theft-resisting casing supporting and at least partially enclosing said coil; a second unitary article of manufacture including, lock-controlled switch means, and a second theft-resisting casing supporting and at least partially enclosing said switch means, connections connecting said switch means in controlling relation with said coil; and means uniting said second theft-resisting casing with said first theft-resisting casing completely enclosing said switch means and said connections and securing said casings into a single enclosure for preventing at least unauthorized access to said switch means and said connections and at least the adjacent portion of said coil, at least not without disruption of said unit, said second casing being provided with mounting means for said unit.

14. A coil-switch unit comprising, in combination, a tubular housing; an ignition coil within the housing; an end wall for the housing; a switch including a stationary contact insulatingly mounted on the end wall and including a movable contact; a switch controller connected with the movable contact; and a switch case comprising said end wall, a member carrying the controller, a tubular body attached to the coil housing, and means for fixing the member against the tubular body.

15. A coil-switch unit comprising, in combination, a tubular housing formed of relatively thin sheet metal; an ignition coil within the housing; an end wall for the housing; a switch including a stationary contact insulatingly mounted on the end wall and including a movable contact; a key receiving plug connected with the movable contact; a bearing for the key plug; and a switch case comprising said end wall, a member carrying the bearing, a metallic tubular body attached to the coil housing, and means for fixing the member against the tubular body.

16. A coil-switch unit comprising, in combination, a unitary sub-assembly comprising a tubular housing, a coil within the housing, an end wall member for the housing, a switch contact insulatingly fixed to the end wall member, and a tubular body surrounding and fixed to the coil housing; a unitary sub-assembly including a member adapted to be fixed to the tubular body, and a switch controller; a movable contact connected with the controller; and means for fixing the member carrying the controller to the tubular body whereby the member, tubular body and end wall member enclose the switch contacts.

17. A coil-switch unit comprising, in combination, a unitary sub-assembly comprising a tubular housing formed of relatively thin sheet metal, an ignition coil within the housing, an end wall member for the housing, a switch contact insulatingly fixed to the end wall member, and a relatively thick metallic tubular body attached to the coil housing; a unitary sub-assembly including a member adapted to be fixed to the tubular body, a cylindrical bearing attached to the member, and a key receiving plug journalled in said bearing; a movable contact connected with the plug; and means for fixing the member carrying the bearing to the tubular body whereby the member, tubular body and end wall member enclose the switch contacts.

18. A coil-switch unit comprising, in combination, a housing, including a tubular part and an end wall; a coil located within the housing; a switch comprising a stationary contact connected with the coil and insulatingly carried by the end wall and a movable contact cooperating with the stationary contact; a switch case including said housing end wall and two members, one of which partially encloses the switch and one of which surrounds the coil housing and is attached directly thereto; means for securing an edge portion of one member to an edge portion of the other member; and a controller connected with the movable contact and carried by the switch case member not attached directly to the coil housing.

19. A coil-switch unit comprising, in combination, a housing including a tubular part and an end wall; a coil located within the housing; a switch comprising a stationary contact connected with the coil and insulatingly carried by the end wall and a movable contact cooperating with the stationary contact; a switch case including said housing end wall and two members, one of which surrounds the coil housing and is attached directly thereto, the other of which partially encloses the switch; means for securing an edge portion of one member to an edge portion of the other member; and a controller connected with the movable contact and carried by the switch case member partially enclosing the switch.

20. In an ignition system for an internal combustion engine of an automotive vehicle, a unit comprising: the ignition coil of said system; a first theft-resisting casing at least partially enclosing said coil; a lock-controlled switch means; connections connecting said switch means in controlling relation with said coil; and a second theft-resisting casing united rim to rim with said first theft-resisting casing by a joinder securing said casings into a single enclosure for preventing at least unauthorized access to said switch means and said connections and at least the adjacent portion of said coil, at least not without disruption of said unit, one of said theft-resisting casings partially enclosing said switch.

21. In an ignition system for an internal combustion engine of an automotive vehicle, a unit comprising: a first unitary article of manufacture including, the ignition coil of said system, and a first theft-resisting casing supporting and at least partially enclosing said coil; a second unitary article of manufacture including, lock-controlled switch means, and a second theft-resisting casing supporting said switch means; connections connecting said switch means in controlling relation with said coil; and means uniting said second theft-resisting casing with said first theft-resisting casing completely enclosing said switch means and said connections and securing said casings into a single enclosure for preventing at least unauthorized access to said switch means and said connections and at least the adjacent portion of said coil, at least not without disruption of said unit, one of said theft-resisting casings partially enclosing said switch.

22. A coil-switch unit comprising, in combination, a tubular housing: an ignition coil within the housing; a housing end wall member supporting a part of the coil; a switch including a stationary contact insulatingly mounted on the end wall member and including a movable contact; a switch controller connected with the movable contact; and a switch case comprising said end wall member, a member carrying the controller, a tubular body attached to the coil housing, and means for fixing the controller carrying member to the tubular body.

23. A coil-switch unit comprising, in combination, a unitary sub-assembly comprising a tubular housing formed of relatively thin sheet metal, an ignition coil within the housing, a non-conducting housing end wall member supporting a part of the coil, a switch contact carried by the end wall member, and a relatively thick metallic tubular body attached to the coil housing; a unitary subassembly including a member adapted to be fixed to the tubular body, and a switch controller; a movable contact connected with the controller; and means for fixing the controller carrying member to the tubular body.

24. A coil-switch unit comprising, in combination, a tubular housing; a coil within the housing; an end wall member for the housing and supporting a part of the coil; a switch including a stationary contact connected with the coil and insulatingly supported upon said end wall member, and including a movable contact; a switch case including said housing end wall and two members, one of which partially encloses the switch and one of which surrounds the coil housing and is attached directly thereto; means for securing said two members together; and a controller connected with the movable contact and carried by the switch case member not attached directly to the coil housing.

25. Ignition apparatus comprising, in combination, a subassembly unit including an ignition coil having a housing providing a switch case member and a switch stationary contact mounted on said switch case member; a subassembly unit comprising a second switch case member attachable to the ignition coil housing and a switch operating member movably supported by the second switch case member; a switch movable contact driven by the switch operating member; and means for securing said subassembly units together in a predetermined relation whereby the switch movable contact will be brought into proper cooperative relation with respect to the switch stationary contact when said subassembly units are secured together.

26. Ignition apparatus, such as defined by claim 25, and in which the ignition coil housing includes a member which provides a non-conducting support for certain coil parts within the coil housing and which provides, as a part of the switch case, a non-conducting support for the switch stationary contact.

In testimony whereof the DELCO-REMY

CORPORATION hereby affixes its hand and seal by its fully authorized officers.

[L. S.] DELCO-REMY CORPORATION,
*Assignee of Harry E. Norviel, Deceased.*
By F. C. KROEGER,
*President.*

Attest:
B. D. COOPER,
*Assistant Secretary.*